(12) United States Patent
Jadhav et al.

(10) Patent No.: US 10,616,093 B2
(45) Date of Patent: Apr. 7, 2020

(54) DEVICE AND METHOD FOR BALANCED AD-HOC NETWORK FORMATION

(71) Applicant: HUAWEI TECHNOLOGIES CO., LTD., Shenzhen, Guangdong (CN)

(72) Inventors: Rahul Arvind Jadhav, Bangalore (IN); Vijayachandran Mariappan, Bengaluru (IN); Rabi Narayan Sahoo, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/028,815

(22) Filed: Jul. 6, 2018

(65) Prior Publication Data

US 2018/0331940 A1    Nov. 15, 2018

Related U.S. Application Data

(63) Continuation of application No. PCT/CN2017/070167, filed on Jan. 4, 2017.

(30) Foreign Application Priority Data

Jan. 7, 2016 (IN) .............................. 201641000628

(51) Int. Cl.
*H04L 12/727* (2013.01)
*H04W 40/04* (2009.01)
(Continued)

(52) U.S. Cl.
CPC .......... *H04L 45/121* (2013.01); *H04L 45/123* (2013.01); *H04L 45/125* (2013.01);
(Continued)

(58) Field of Classification Search
CPC ... H04L 45/121; H04L 45/123; H04L 45/125; H04L 45/48; H04L 45/24; H04L 45/22;
(Continued)

(56) References Cited

U.S. PATENT DOCUMENTS 8,654,649 B2    2/2014  Vasseur et al.
9,246,805 B2    1/2016  Yoneyama et al.
(Continued)

FOREIGN PATENT DOCUMENTS

CN    102833810 A    12/2012
CN    104168603 A    11/2014

OTHER PUBLICATIONS

Kim, Hyung-Sin et al., "QU-RPL: Queue Utilization based RPL for Load Balancing in Large Scale Industrial Applications," 2015 IEEE SECON, Jun. 22, 2015, XP032817380, pp. 265-273.
(Continued)

*Primary Examiner* — Afshawn M Towfighi
(74) *Attorney, Agent, or Firm* — Fish & Richardson P.C.

(57) ABSTRACT

In one implementation, the present invention provides a mechanism for balanced ad-hoc network formation. To achieve the for balanced ad-hoc network formation, the present invention sends the metric information with DIO control message. A new metric container type is introduced in RPL to hold the metric information, and select the parent with minimum path cost, and switch the parent with minimum path cost, as per the defined logic. A stateless metric considers that the average traffic flow from each node is approximately same. The stateless metric directly uses the number of routing table entries ($RT_{size}$) to decide which path to use. A stateful metric, wherein the node keeps a track of packets processed per second by itself. For stateful metric, the node maintains packets processed rate (PPR) variable, which is then used as the metric.

17 Claims, 8 Drawing Sheets

(51) Int. Cl.
*H04L 12/729* (2013.01)
*H04L 12/721* (2013.01)
*H04L 12/751* (2013.01)
*H04L 12/707* (2013.01)
*H04W 40/34* (2009.01)
*H04L 12/753* (2013.01)
*H04W 40/24* (2009.01)

(52) U.S. Cl.
CPC .............. *H04W 40/04* (2013.01); *H04L 45/02* (2013.01); *H04L 45/22* (2013.01); *H04L 45/24* (2013.01); *H04L 45/48* (2013.01); *H04W 40/246* (2013.01); *H04W 40/34* (2013.01)

(58) Field of Classification Search
CPC .... H04L 45/02; H04W 40/04; H04W 40/246; H04W 40/34
See application file for complete search history.

(56) References Cited

U.S. PATENT DOCUMENTS

| | | | |
|---|---|---|---|
| 2011/0069634 A1* | 3/2011 | Hajiaghayi | H04L 45/00 370/254 |
| 2011/0235504 A1 | 9/2011 | Nozaki et al. | |
| 2013/0028143 A1* | 1/2013 | Vasseur | H04W 40/22 370/256 |
| 2014/0204759 A1 | 7/2014 | Guo et al. | |

OTHER PUBLICATIONS

Di Marco, Piergiuseppe et al., "MAC-aware Routing Metrics for Low Power and Lossy Networks," INFOCOM, 2013 Proceedings IEEE, Apr. 14, 2013, XP032440681, pp. 13-14.

Gnawali, O. et al., "The Minimum Rank with Hysteresis Objective Function," Internet Engineering Task Force (IETF)-RFC6719, Sep. 30, 2012, XP055506712, pp. 1-13.

Extended European Search Report, dated Nov. 26, 2018, in European Application No. 17735821.5 (12 pp.).

International Search Report dated Mar. 1, 2017 in corresponding International Patent Application No. PCT/CN2017/070167.

J. Tripathi et al., "Quantifying Load Imbalance: A Practical Implementation for Data Collection in Low Power Lossy Networks," Information Sciences and Systems (CISS), 2013 47th Annual Conference on Oct. 10, 2013 (Oct. 10, 2013) (6 pp.).

Adam Dunkels et al., "Contiki—a Lightweight and Flexible Operating System for Tiny Networked Sensors," In Proceedings of the First IEEE Workshop on Embedded Networked Sensors, Tampa, Florida, USA, Nov. 2004 (8 pp.).

F. Österlind et al., "Cross-Level Sensor Network Simulation with COOJA," in Local Computer Networks, Proceedings 2006 31st IEEE Conference on, Nov. 2006 (8 pp.).

RFC6550, T. Winter et al., "RPL: IPv6 Routing Protocol for Low-Power and Lossy Networks," dated Mar. 2012, pp. 1-157.

Guttman E., "Autoconfiguration for IP Networking: Enabling Local Communication," IEEE Internet Computing 5(1), May-Jun. 2001, pp. 81-86.

Xinxin Liu et. al., "Load Balanced Routing for Low Power and Lossy Networks," Wireless Communications and Networking Conference (WCNC), Shanghai—China, 2013 IEEE (8 pp.).

RFC6551 JP. Vasseur, Ed. et al., "Routing Metrics Used for Path Calculation in Low-Power and Lossy Networks," Internet Engineering Task Force (IETF), Mar. 2012, pp. 1-30.

Adam Dunkels et al., "Powertrace: Network-level Power Profiling for Low-power Wireless Networks," Swedish Institute of Computer Science, dated 2011 pp. 1-14.

International Search Report, dated Mar. 1, 2017, in International Application No. PCT/CN2017/070167 (4 pp.).

Written Opinion of the International Searching Authority, dated Mar. 1, 2017, in International Application No. PCT/CN2017/070167 (7 pp.).

Office action issued in Indian Application No. 201641000628 dated Oct. 4, 2019, 6 pages (With Partial English Translation).

* cited by examiner

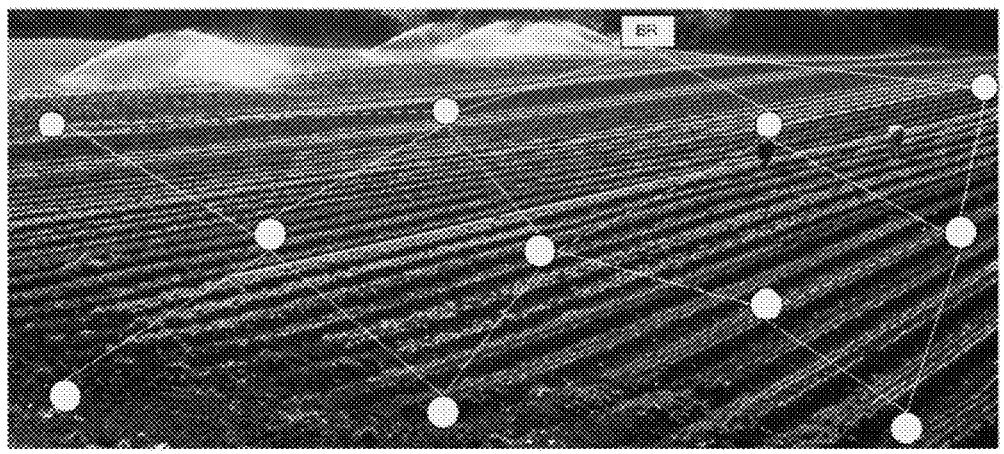
Figure 1 (PRIOR-ART)
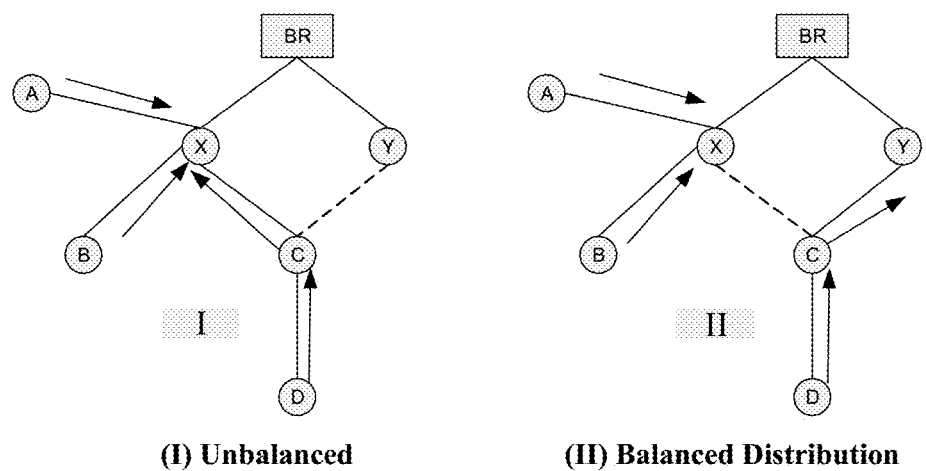
(I) Unbalanced  (II) Balanced Distribution
Figure 2 (PRIOR-ART)

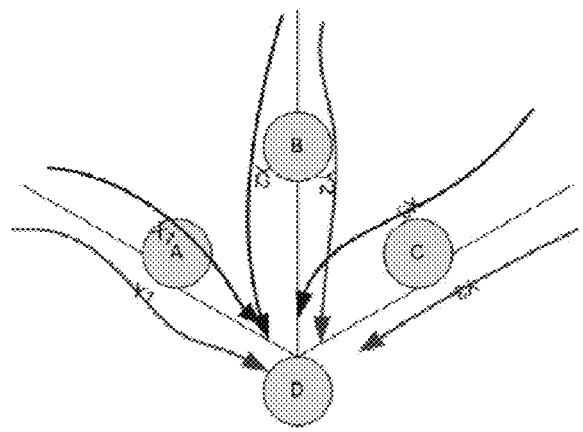
Figure 3 (PRIOR-ART)
| Parent | MAC Address | Aggregated Link Metric1 (ETX) | Aggregated Link Metric2 (Latency) |
|--------|-------------|-------------------------------|-----------------------------------|
| A | Ma | X1 | Y1 |
| B | Mb | X2 | Y2 |
| C | Mc | X3 | Y3 |
Figure 4 (PRIOR-ART)
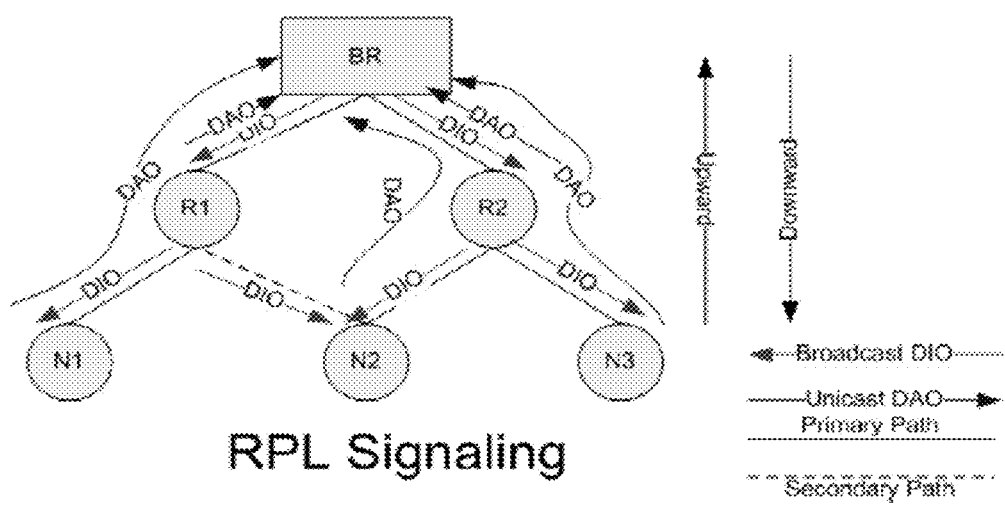
Figure 5 (PRIOR-ART)

| Type = 0x02 | Option Length | Metric Data |

| Routing-MC-Type|Res Flags|P|C|O|R| A | Prec | Length (bytes) |

// (object body) //

```
    0                   1
    0 1 2 3 4 5 6 7 8 9 0 1 2 3
    +-+-+-+-+-+-+-+-+-+-+-+-+-+-+
    | (sub-object) .....
    +-+-+-+-+-+-+-+-+-+-+-+-+-+-+

0                       1
    0 1 2 3 4 5 6 7 8 9 0 1 2 3 4 5
    +-+-+-+-+-+-+-+-+-+-+-+-+-+-+-+-+
    |              ETX              |
    +-+-+-+-+-+-+-+-+-+-+-+-+-+-+-+-+
```

Figure 10

```
    +-+-+-+-+-+-+-+-+-+-+-+-+-+-+-+-+
    |            RTsize              
    +-+-+-+-+-+-+-+-+-+-+-+-+-+-+-+-+
```

Figure 11

```
    0                   1
    0 1 2 3 4 5 6 7 8 9 0 1 2 3
    +-+-+-+-+-+-+-+-+-+-+-+-+-+-+
    | (sub-object) .....
    +-+-+-+-+-+-+-+-+-+-+-+-+-+-+

0                       1
    0 1 2 3 4 5 6 7 8 9 0 1 2 3 4 5
    +-+-+-+-+-+-+-+-+-+-+-+-+-+-+-+-+
    |            RTsize             |
    +-+-+-+-+-+-+-+-+-+-+-+-+-+-+-+-+
```

Figure 12

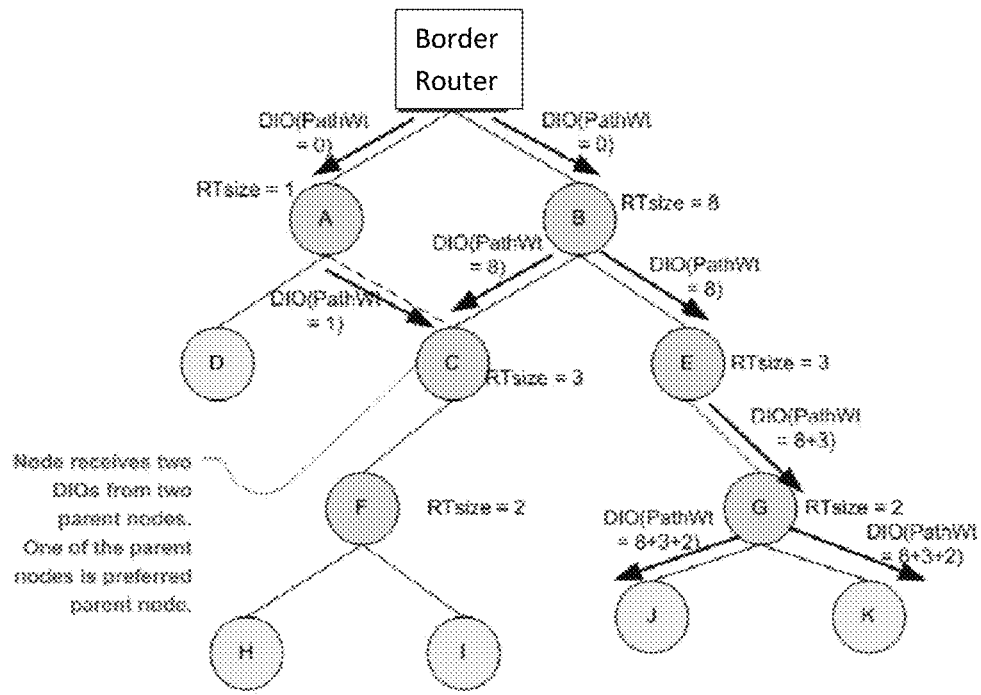
Figure 14 (PRIOR-ART)
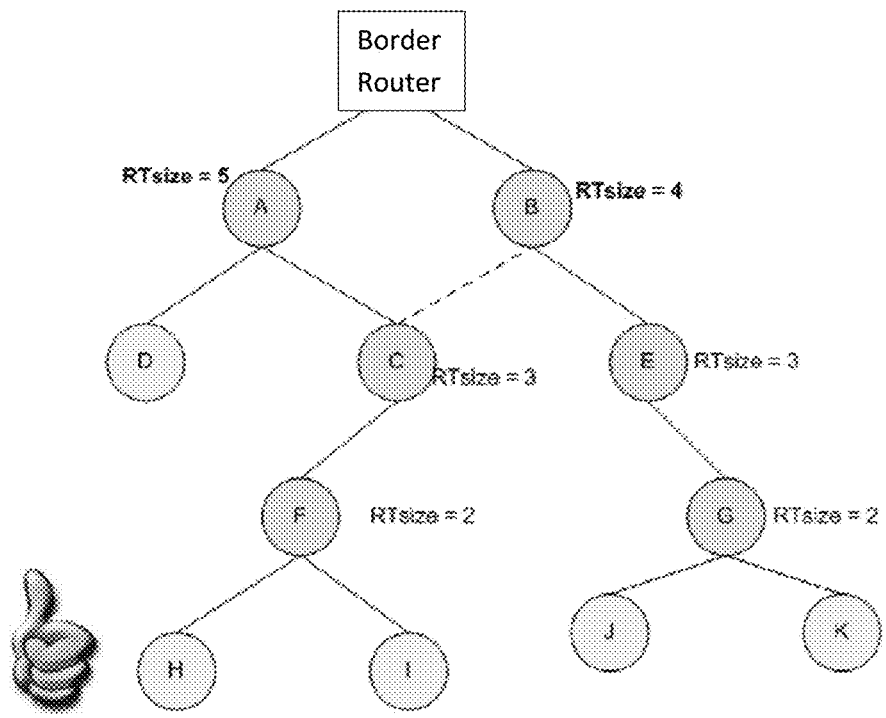
Figure 15

DEVICE AND METHOD FOR BALANCED AD-HOC NETWORK FORMATION

CROSS-REFERENCE TO RELATED APPLICATION

This application is a continuation of International Application No. PCT/CN2017/070167, filed on Jan. 4, 2017, which claims priority to Indian Patent Application No. IN201641000628, filed on Jan. 7, 2016. All of the aforementioned patent applications are hereby incorporated by reference in their entireties.

TECHNICAL FIELD

The present subject matter described herein, in general, relates to routing packets in wireless networks, and more particularly, to devices, systems and methods for balanced Ad-hoc network formation to improve network lifetime.

BACKGROUND

Internet of Things (IoT) enables all the general purpose devices/appliances, sensors/actuators to be connected to the Internet, thus allowing a greater control in terms of monitoring, commanding these devices from anywhere and anytime. An example to be given is Building Automation where all the sensors (fire sensors, temperature sensors, etc.), lights, room curtains, door locks, are connected to the Internet and can be controlled remotely/locally using a mobile application or any other easy-to-use device. These devices usually form a network in an ad-hoc mode wherein devices connect to each other to eventually reach a Border Router (BR) through which the devices are connected to the Internet.

Low-Power and Lossy Networks (LLN) is a network of spatially distributed autonomous and resource constrained sensors/actuators to monitor physical or environmental conditions, such as temperature, sound, pressure, etc., and to cooperatively pass their data through the network to a main location. The nodes in such a network are extremely constrained in following aspects: less memory (both RAM, ROM, flash), less processing power, less network bandwidth, less power (battery operated nodes), and the like. The networks when constructed in a mesh formation such that nodes connect to one or more than one intermediate routers are referred to as Ad-hoc Networks. Routing Protocol for LLNs (RPL) is one of the most widely used routing protocol in LLNs. The routing tables/paths are constructed by considering various metrics and constraints such as ETX (Estimated number of transmissions), Latency, and/or Energy of the node. A Network lifetime is defined as the amount of time before a first node in the network fails. Overuse of the node resulting in power drain could be the failure reason.

FIG. 1 illustrates an exemplary scenario to explain the problems of failure of network. As shown in FIG. 1, consider a smart-agriculture scenario where sensors are deployed to measure the moisture level of the soil. The sensors help in analyzing the water requirements for the crops and make optimal use of available water resource. The sensors periodically send information to the remote server where the information is analyzed to decide whether to pump in more water and in which section of farmlands. The sensors are distributed over the farm land and there will usually be only one border router for thousands of such sensors. Thus sensors connect to each other in ad-hoc manner. The sensors will usually be battery operated since it may not be possible to get mains-powered connection in all the areas of interest in the farmland. The ad-hoc network formation decides how the traffic pattern is distributed among the nodes. The more the traffic is handled by the node, the faster its battery is going to be depleted. Thus it becomes necessary that the network formation is such that the overall traffic is optimally distributed.

FIG. 2 illustrates an example of the optimal traffic distribution. As shown in FIG. 2, consider topology I where the network formation shows that Node X acts as a router for Nodes A, B, C, D whereas Node Y in topology I do not receive any traffic from other nodes even though there exists connectivity from other nodes such as C (shown in dotted line). This results in more traffic getting received on Node X whereas Node Y is left idling. This results in relatively more battery consumption on Node X as compared to Node Y, resulting in Node X failing lot before Node Y. In case II, the topology formation is balanced such that node C is connected to Node Y and because of that Node D traffic is also routed through Node Y. Thus Node X and Y share almost equal amount of traffic (considering equal amount of traffic getting generated from each node). Thus the battery consumption in the overall network is evenly balanced at a given level in the tree. This results in optimal lifespan of the network. In order to have a balanced network to achieve the optimal traffic distribution, the prior-art provides various solutions and approaches.

The ETX-based routing metric approach enables is a routing metric wherein a node tries to use a path which results in least number of (re)transmissions. This is one of the most widely adopted routing metric and the default to be used as per the standards. However, the ETX based routing metric results in unbalanced network formation. The reason is that the ETX metric does not give any consideration to network balancing and primarily works for optimizing/reducing the number of transmissions while sending the packet.

The node energy based routing metric approach provides a routing metric wherein a node which has the most battery is preferred as the next hop. This is a reactive approach wherein only once the battery level drops below certain threshold will it be considered to be not used. Meanwhile if the network formation dynamics change then this routing metric will not be able ensure balanced battery consumption. However, Node Energy works by forming a network topology which considers node energy as the routing metric. This is a reactive approach for network balancing. The reason for calling it reactive is because the network topology formation changes once the node energy depletes to a certain threshold. The problem is that during this time the network nodes might have moved and may cause suboptimal balancing of energy in the network.

In view of issues available in prior-art literature there is a dire need to provide a technique to address a network balancing issue under the non-uniform node distribution as current routing protocols does not have any metrics/constraints to deal proactively with network imbalance. Further, it is also required to have an optimal balancing of the network such a way that all the nodes at the same level shares near-about equal traffic. It is desired to reduce the impact of node addition/removal so as to maintain the optimal balancing of the network. Furthermore, is also desired to reduce complexities in the logics to control the overheads be handling uneven traffic and still achieve the proactive balancing of the network.

SUMMARY

This summary is provided to introduce concepts related to device and method for balanced ad-hoc network formation, and are further described below in the detailed description. This summary is not intended to identify essential features of the claimed subject matter nor is it intended for use in determining or limiting the scope of the claimed subject matter.

A main objective of the present invention is to achieve an optimal balancing of the network so that each node shares more or less equal amount of traffic. The optimal balancing of the traffic in the network further enables to evenly balance the battery consumption in the overall network at a given level in the network tree and thereby results in optimal lifespan of the network.

Another objective of the present invention is to provide new metrics that will be used for balancing the RPL network.

Another objective of the present invention is to provide a stateless metric which considers that the average traffic flow from each node is approximately same. In certain networks, the traffic flow is more or less equal from all the nodes. The stateless metric directly uses the number of routing table entries ($RT_{size}$) on the node and the path of the node to decide which path to use.

Another objective of the present invention is to provide a stateful metric, wherein the node keeps a track of packets processed per second by it. In certain networks, the traffic generation may be highly uneven and small number of nodes may cause more amount of traffic. For stateful metric, the node maintains packets processed rate (PPR) variable, which is then used as the metric. The stateful metric will result in more "load" balanced path formation since it considers the actual traffic flow from the nodes.

Yet another objective of the present invention is to provide a new objective function called a Balanced network objective function (BNOF) that will use routing table size (RTsize) as the metric object in case storing mode of operation, and Packet Processed Rate (PPR) as the metric object in case of non-storing mode of operation. The BNOF is configured to choose a neighbor/neighbour node with minimum path cost as a preferred parent.

Yet another objective of the present invention is to provide a Directed Acyclic graph (DAG) metric container option of the Destination Oriented Directed Acyclic GraphInformation Object (DIO) message that stores the RTsize and PPR object information.

Yet another objective of the present invention is to introduce a new metric container type in RPL to hold the metric information with DIO control message.

Still another objective of the present invention is to enable Border router and all the nodes in the network support routing metrics RTsize (Routing table size) and PPR (packets processed rate).

In order to provide a technical solution to the above mentioned technical problems, the present invention provides a mechanism for balanced ad-hoc network formation. To achieve balanced ad-hoc network formation, the present invention:
  sends the metric information with DIO control message.
    A new metric container type is introduced in RPL to hold the metric information.
  select the parent with minimum path cost, and
  switch the parent with minimum path cost, as per the defined logic.

Accordingly, in one implementation, the present invention provides a device. The device comprises at least one receiving module configured to receive at least one metric information from at least one other device; at least one selection module configured to calculate at least one path cost of at least one neighbouring device, selected from one or more devices in an Ad-hoc network, according to the metric information received, and select, if the path cost of neighbouring device is minimum, the neighbouring device as a parent device; and at least one switching module configured to switch the parent device based on selection and based on an amount of workload, wherein a current parent device of the device is switched to the parent device if the path cost of parent device is minimum as compared to a path cost of the current parent device, and the amount of workload of the parent device is less as compared to the amount of workload of the current parent device.

In one implementation, the present invention provides a node. The node comprises at least one receiving module configured to receive at least one metric information from at least one border router; at least one selection module configured to calculate at least one path cost of at least one neighbouring node, selected from one or more nodes in an Ad-hoc network, according to the metric information received, and select, if the path cost of neighbouring node is minimum, the neighbouring node as a parent node; and at least one switching module configured to switch a current parent node with the parent node based on selection and based on an amount of workload of the parent node and the current parent node, respectively, wherein the current parent node of the node is switched to the parent node if the path cost of parent node is minimum as compared to a path cost of the current parent node, and the amount of workload of the parent node is less as compared to an amount of workload of the current parent node.

In one implementation, the present invention provides a method for routing packets by a device in Routing Protocol for LLN (RPL) based balanced Ad-hoc network formation. The method comprises:
  receiving at least one metric information from at least one other device;
  calculating at least one path cost of at least one neighbouring device, selected from one or more devices in an Ad-hoc network, according to the metric information received;
  selecting, if the path cost of neighbouring device is minimum, the neighbouring device as a parent device; and
  switching the parent device based on selection and based on an amount of workload, wherein a current parent device of the device is switched to the parent device if the path cost of parent device is minimum as compared to a path cost of the current parent device, and the amount of workload of the parent device is less as compared to the amount of workload of the current parent device.

In one implementation, the present invention provides a method for routing packets by a node in Routing Protocol for LLN (RPL) based balanced Ad-hoc network formation. The method comprises:
  receiving at least one metric information from at least one border router;
  calculating at least one path cost of at least one neighbouring node, selected from one or more nodes in an Ad-hoc network, according to the metric information received;
  selecting, if the path cost of neighbouring node is minimum, the neighbouring node as a parent node; and
  switching a current parent node with the parent node based on selection and based on an amount of workload of the parent node and the current parent node, respectively, wherein the current parent node of the node is switched to the parent node if the path cost of parent node is minimum as compared to a path cost of the current parent node, and the amount of workload of the parent node is less as compared to an amount of workload of the current parent node.

In one implementation, the present invention provides a balanced Ad-hoc network formation using Routing Protocol for LLN (RPL) based communication. The balanced Ad-hoc network formation comprises a device having at least one receiving module configured to receive at least one metric information from at least one other device; at least one selection module configured to calculate at least one path cost of at least one neighbouring device, selected from one or more devices in an Ad-hoc network, according to the metric information received; and select, if the path cost of neighbouring device is minimum, the neighbouring device as a parent device; and at least one switching module configured to switch the parent device based on selection and based on an amount of workload, wherein a current parent device of the device is switched to the parent device if the path cost of parent device is minimum as compared to a path cost of the current parent device, and the amount of workload of the parent device is less as compared to the amount of workload of the current parent device.

In one implementation, the present invention provides a balanced Ad-hoc network formation using Routing Protocol for LLN (RPL) based communication. The balanced Ad-hoc network formation comprises a node having at least one receiving module configured to receive at least one metric information from at least one border router; at least one selection module configured to calculate at least one path cost of at least one neighbouring node, selected from one or more nodes in an Ad-hoc network, according to the metric information received, and select, if the path cost of neighbouring node is minimum, the neighbouring node as a parent node; and at least one switching module configured to switch a current parent node with the parent node based on selection and based on an amount of workload of the parent node and the current parent node, respectively, wherein the current parent node of the node is switched to the parent node if the path cost of parent node is minimum as compared to a path cost of the current parent node, and the amount of workload of the parent node is less as compared to an amount of workload of the current parent node.

The present invention solves the below mentioned technical problems along with the already discussed technical problems:

- As the current routing protocols do not have any metrics/constraints to deal proactively with network imbalance. Further, the current approaches does not ensure that the network is formed in a balanced state initially itself rather than balancing once the energy levels change, hence there is need to provide a new metrics/constraints to deal proactively with network imbalance that ensures that the network is formed in a balanced state initially itself rather than balancing once the energy levels change.
- The current approaches do not provide optimal balancing of network. Hence there is a need to provide an ad-hoc network formation in such a way that all the nodes at the same level share the traffic near-about equally.
- The current approaches have huge impact of node addition/removal in the existing network and hence there is a need for a separate logic to adopt quickly changing network even in the case of node removal or addition.
- The current approaches involve complex logics and thereby uses huge amount of memory for the storage, hence there is a need to provide a logic that does not introduce much complexity or more RAM usage and thus is suitable for constrained nodes.
- The current approaches when add any new control flows to the signaling procedures and thereby adds additional control overhead, hence there is a need to provide a mechanism that does not add any new control flows to the signaling procedures and thus works without adding any additional control overhead.
- The current approaches are not efficient enough to handle the uneven traffic from the nodes, hence there is need to provide a mechanism by which the uneven traffic from the nodes are handled efficiently.

In contrast to the prior-art techniques available, the present invention, a new objective function BNOF (Balanced network objective function) that uses a Routing table size (RTsize) as the metric object in case storing mode of operation, and/or a Packet Processed Rate (PPR) as the metric object in case of non-storing mode of operation. Both of the RTsize and PPR object information are sent in the DAG metric container option of the DIO message. A stateless metric considers that the average traffic flow from each node is approximately same. In certain networks, the traffic flow is more or less equal from all the nodes. The stateless metric directly uses the number of routing table entries ($RT_{size}$) to decide which path to use. A stateful metric, wherein the node keeps a track of packets processed per second by itself. In certain networks, small number of nodes may cause more amount of traffic. For stateful metric, the node maintains packets processed rate (ppr) variable, which is then used as the metric. The stateful metric will result in more "load" balanced path formation since it considers the actual traffic flow from the nodes.

BRIEF DESCRIPTION OF THE ACCOMPANYING DRAWINGS

The detailed description is described with reference to the accompanying figures. In the figures, the left-most digit(s) of a reference number identifies the figure in which the reference number first appears. The same numbers are used throughout the drawings to refer like features and components.

FIG. 1 illustrates an exemplary smart-agriculture scenario with sensor nodes.

FIG. 2 illustrates an unbalanced (I) and a balanced distribution of the traffic in a network.

FIG. 3 illustrates a sample topology where node D is connected to parent A, B, and C.

FIG. 4 illustrates a routing metric information maintained on per parent basis by Node D.

FIG. 5 illustrates an RPL Signaling Overview.

FIG. 10 illustrates an ETX metric object available in the prior-art.

FIG. 11 illustrates a format of the RTSize object, in accordance with an embodiment of the present subject matter.

FIG. 12 illustrates an RTsize Metric Object, in accordance with an embodiment of the present subject matter.

FIG. 14 illustrates a network formation as per the prior-art techniques available.

FIG. 15 illustrates a balanced network formation using stateless routing metric RTsize, in accordance with an embodiment of the present subject matter.

Figure 6:
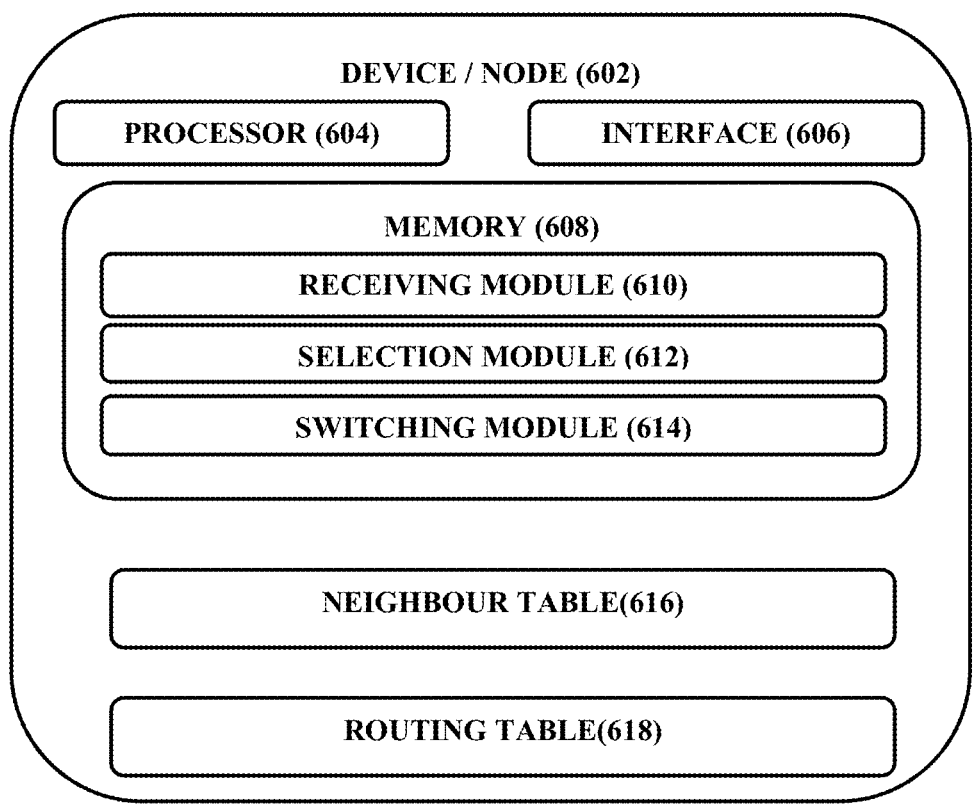
FIG. 6 illustrates a device or a node (602), in accordance with an embodiment of the present subject matter.

It is to be understood that the attached drawings are for purposes of illustrating the concepts of the invention and may not be to scale.

DETAILED DESCRIPTION OF THE PRESENT INVENTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Devices and methods for balanced ad-hoc network formation are disclosed.

While aspects are described for devices and methods Balanced Ad-hoc network formation to improve network lifetime, the present invention may be implemented in any number of different computing systems, environments, and/or configurations, the embodiments are described in the context of the following exemplary systems, apparatus, and methods.

In one implementation, the present invention provides a mechanism for balanced ad-hoc network formation. To achieve the for balanced ad-hoc network formation, the present invention:
   sends the metric information with DIO control message. A new metric container type is introduced in RPL to hold the metric information.
   select the parent with minimum path cost, and
   switch the parent with minimum path cost, as per the defined logic.

In one implementation, the present invention enables the system to provide an ability to tag the related process entities/data pertaining to a specific process instance and store the related data consistently in one of the cluster of database servers based on a pluggable rule.

RPL based Ad-hoc network formation is well known in the prior-art. The RPL is a standardized protocol used for ad-hoc network formation. The RPL based Ad-hoc network formation works in following stages:

1. Network Information Dissemination in the Network:

This starts at border router which chooses the set of routing metrics/constraints to use, forms a DIO message using that information and broadcasts it at the link layer so that only the nodes directly reachable to the BR receive this information. The routing metrics may be defined by the existing standards that may be selected from Latency (the network is formed to reduce overall latency), Number of hops (Aim is to reduce number of hops in the network), Estimated number of retransmissions, reduce retransmissions (ETX), Node energy (Use the nodes which are mains powered and try not to battery operated nodes), and the like.

2. Maintaining Path Costs:

Any nodes receiving these DIOs (messages) with corresponding routing metrics/constraints, first checks whether they comply with all the constraints mentioned and then maintain the routing metric/constraint on per parent basis. Note that a node may receive routing metrics/constraints from multiple nodes and it has to decide which DIO to accept depending on the routing metric/constraints. For e.g. a node may choose a particular DIO coming from a particular parent node because the path cost is less. On accepting the DIO the node chooses the parent from whom this DIO was received as the preferred one and the forwards the DIO. Before forwarding the DIO, the node updates the routing metrics by adding/aggregating/accumulating its own path cost. This updates DIO is then link layer broadcasted to the subsequent nodes. For example, as show in in FIG. 3, shows a sample topology where node D is connected to parent A, B, and C. Every child node keeps the metric information on per parent node basis so as to identify or switch to a new parent if required. The parameters that are maintained are different metrics (any of the metrics mention above). Every node who has any parent nodes maintains this information. FIG. 4 illustrates a routing metric information maintained on per parent basis by Node D according to FIG. 3.

3. Eventually all the Nodes Join the Network and have their Own Cost of Reaching to the Border Rout (BR) Node (Also Called the DODAG Root).

In some cases, to disseminate the metrics in the RPL based network, the nodes in the network advertises their presence, affiliation with a DODAG, routing cost, and related metrics by sending link-local multicast DIO (DODAG Information Object) messages to all-RPL-nodes.

The DODAG root (usually the border router) is responsible to form the DODAG by sending a DIO message. Nodes listen for DIOs and use this information to join a new DODAG (thus, selecting DODAG parents), or to maintain an existing DODAG, according to the specified Objective Function (OF) and Rank of their neighbours. The OF basically uses the routing metrics advertised by the neighbours of a node to calculate the path cost through that neighbour to the DODAG root. Using these path costs node will have a list of preferred parents and selects the neighbour with minimum path cost as its preferred parent. Then node sends unicast DAO through the preferred parent to establish the downward path from root to that node. The non-leaf nodes capable of routing will send the DIO further down in the network. The RPL signalling flow is shown in FIG. 5.

It may be understood by the person skilled in that art that the related metrics may include different types of metrics such as but not limited to: Latency: The amount of time for a packet to be transmitted from the node to the BR. This information is initialized with default value and then over a period of time it is updated;

ETX: Number of retransmissions attempts that needs to be done by a node to successfully transmit the packet to the BR. This metric is initialized with a default value and updated over a period of time;

Number of hops: Number of intermediate nodes before finally connecting to BR. This information is obtained at run-time;

Node Energy: Whether the node is battery operated or mains powered. This information the node has apriori and is statically maintained in the node.

It may be also understood by the person skilled in the art that, the DODAG parents are selected based on the link metric. For example, referring now to FIG. 3, the Node D is connected to A, B, and C. Node D selects Node A as its parent because the link metric for node A are better. Values of X1<(X2 or X3) or/and Value of Y1<(Y2 or Y3).

Further it may be also known to the person skilled in that art that, objective functions (OF) are predefined as part of standards. The output of an objective function is a rank. Objective function 0 is a standard function which minimizes hop count (number of hops) and objective function 1 is another standard function which minimizes ETX.

Referring now to FIG. 6, a device or a node 602 is illustrated, in accordance with an embodiment of the present subject matter. In one implementation, the present invention provides the device/node 602 that comprises a processor 604, and a memory 608 coupled to the processor for executing a plurality of modules stored in said memory 608.

Although the present subject matter is explained considering that the present invention is implemented as a device or a node 602, it may be understood that the device or a node 602 may also be implemented in a variety of computing systems, such as a laptop computer, a desktop computer, a notebook, a workstation, a mainframe computer, a server, a network server, and the like. It will be understood that the device or a node 602 may be accessed by multiple users, or applications residing on the device or a node 602. Examples of the device or a node 602 may include, but are not limited to, a portable computer, a personal digital assistant, a handheld device, sensors, routers, gateways and a workstation. The device or a node 602 are communicatively coupled to other devices or a nodes to form a network (not shown).

In one implementation, the network may be a wireless network, a wired network or a combination thereof. The network can be implemented as one of the different types of networks, such as GSM, CDMA, LTE, UMTS, intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

The device or a node 602 is illustrated in accordance with an embodiment of the present subject matter. In one embodiment, the device or a node 602 may include at least one processor 604, an input/output (I/O) interface 606, and a memory 608. The at least one processor 604 may be implemented as one or more microprocessors, microcomputers, microcontrollers, digital signal processors, central processing units, state machines, logic circuitries, and/or any devices that manipulate signals based on operational instructions. Among other capabilities, the at least one processor 604 is configured to fetch and execute computer-readable instructions or modules stored in the memory 608.

The I/O interface 606 may include a variety of software and hardware interfaces, for example, a web interface, a graphical user interface, and the like. The I/O interface 606 may allow the device or a node 602 to interact with a user directly. Further, the I/O interface 606 may enable the device or a node 602 to communicate with other devices or a nodes, computing devices, such as web servers and external data servers (not shown). The I/O interface 606 can facilitate multiple communications within a wide variety of networks and protocol types, including wired networks, for example, GSM, CDMA, LAN, cable, etc., and wireless networks, such as WLAN, cellular, or satellite. The I/O interface 606 may include one or more ports for connecting a number of devices to one another or to another server. The I/O interface may provide interaction between the user and device or a node 602 via., a screen 606.

The memory 608 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 608 may include plurality of instructions or modules or applications to perform various functionalities. The memory 608 include routines, programs, objects, components, data structures, etc., which perform particular tasks or implement particular abstract data types.

In one implementation, the plurality of modules may include but not limited to at least one receiving module 610, at least one selection module 612, and at least one switching module 614.

In one implementation, a device is disclosed. The device comprises at least one receiving module 610 configured to receive at least one metric information from at least one other device; at least one selection module 612 configured to calculate at least one path cost of at least one neighbouring device, selected from one or more devices in an Ad-hoc network, according to the metric information received, and select, if the path cost of neighbouring device is minimum, the neighbouring device as a parent device; and at least one switching module 614 configured to switch the parent device based on selection and based on an amount of workload, wherein a current parent device of the device is switched to the parent device if the path cost of parent device is minimum as compared to a path cost of the current parent device, and the amount of workload of the parent device is less as compared to the amount of workload of the current parent device.

In one implementation, a node 602 is disclosed. The node 602 comprises at least one receiving module 610 configured to receive at least one metric information from at least one border router; at least one selection module 612 configured to calculate at least one path cost of at least one neighbouring node, selected from one or more nodes in an Ad-hoc network, according to the metric information received, and select, if the path cost of neighbouring node is minimum, the neighbouring node as a parent node; and at least one switching module 614 configured to switch a current parent node with the parent node based on selection and based on an amount of workload of the parent node and the current parent node, respectively, wherein the current parent node of the node is switched to the parent node if the path cost of parent node is minimum as compared to a path cost of the current parent node, and the amount of workload of the parent node is less as compared to an amount of workload of the current parent node.

In one implementation, the metric information is received with at least one Destination Oriented Directed Acyclic Graph Information Object (DIO) control message, wherein the DIO control message comprises at least one container holding the metric information.

In one implementation, the metric information is at least one of a Routing table size (RTsize) as a metric object for storing mode of operation, or a Packet Processed Rate (PPR) as a metric object for non-storing mode of operation or any combination thereof.

In one implementation, the device is configured to rout at least one packet in a low-power and lossy network to achieve a load balanced routing.

In one implementation, the device 602 comprises a memory 608 and a processor 604, wherein the memory 608 is configured to store at least one packet, and the processor is configured to determine the workload based on a number of packets stored in the memory 608.

In one implementation, the device comprises a balanced network objective function (BNOF) holding the metric information, wherein the metric information is at least one of a Routing table size (RTsize) as a metric object for storing mode of operation, or a Packet Processed Rate (PPR) as a metric object for non-storing mode of operation or any combination thereof.

In one implementation, the path cost is calculated based on at least one metric value received with at least one Destination Oriented Directed Acyclic Graph Information Object (DIO) control message, the DIO control message comprises at least one container holding the metric information along with the metric value.

In one implementation, the path cost is calculated based on at least the metric information received, and/or a routing table size of the device, and/or a parent switch threshold.

In one implementation, the path cost is calculated using:

$$PathWt = \begin{cases} NB_{RTSize} \xrightarrow{iff} DIO_{ip} == PrefParent_{ip} \\ NB_{RTSize} + OWN_{RTSize} + 1 \xrightarrow{iff} \text{otherwise} \end{cases}$$

Stateless Routing Metric Calculation $$PathWt = \begin{cases} NB_{PPR} \xrightarrow{iff} DIO_{ip} == PrefParent_{ip} \\ NB_{PPR} + OWN_{PPR} + 1 \xrightarrow{iff} \text{otherwise} \end{cases}$$

Stateful Routing Metric Calculation

Wherein, the value 1 in the above equation is the default parent switch threshold; $NB_{RTSize}$—neighbour's routing table size; PPR—Packet Processed Rate; DIO—Destination Oriented Directed Acyclic Graph Information Object; ip—internet protocol (address); $OWN_{RTSize}$—routing table size of the device.

In one implementation, the device 602 comprises at least one table 616 storing information of the neighbouring devices, wherein the table 616 is updated consecutively on calculation of the path cost.

In one implementation, upon switching the parent device, the device is configured to transmit at least one NO-PATH Destination Oriented Directed Acyclic Graph Advertisement Object (DAO) message to the parent device switched, on receipt of the DAO message, the parent device is configured to delete at least one routing entry from at least one routing table 618 of the parent device for which the device is the next-hop for a downward communication.

In one implementation, a balanced Ad-hoc network formation using Routing Protocol for LLN (RPL) based communication is disclosed. The balanced Ad-hoc network comprises a device having: at least one receiving module 610 configured to receive at least one metric information from at least one other device; at least one selection module 612 configured to calculate at least one path cost of at least one neighbouring device, selected from one or more devices in an Ad-hoc network, according to the metric information received, and select, if the path cost of neighbouring device is minimum, the neighbouring device as a parent device; and at least one switching module 614 configured to switch the parent device based on selection and based on an amount of workload, wherein a current parent device of the device is switched to the parent device if the path cost of parent device is minimum as compared to a path cost of the current parent device, and the amount of workload of the parent device is less as compared to the amount of workload of the current parent device.

In one implementation, a balanced Ad-hoc network formation using Routing Protocol for LLN (RPL) based communication is disclosed. The balanced Ad-hoc network comprises a device having: at least one receiving module 610 configured to receive at least one metric information from at least one border router; at least one selection module 612 configured to calculate at least one path cost of at least one neighbouring node, selected from one or more nodes in an Ad-hoc network, according to the metric information received, and select, if the path cost of neighbouring node is minimum, the neighbouring node as a parent node; and at least one switching module 614 configured to switch a current parent node with the parent node based on selection and based on an amount of workload of the parent node and the current parent node, respectively, wherein the current parent node of the node is switched to the parent node if the path cost of parent node is minimum as compared to a path cost of the current parent node, and the amount of workload of the parent node is less as compared to an amount of workload of the current parent node.

Figures 7, 8, 9:
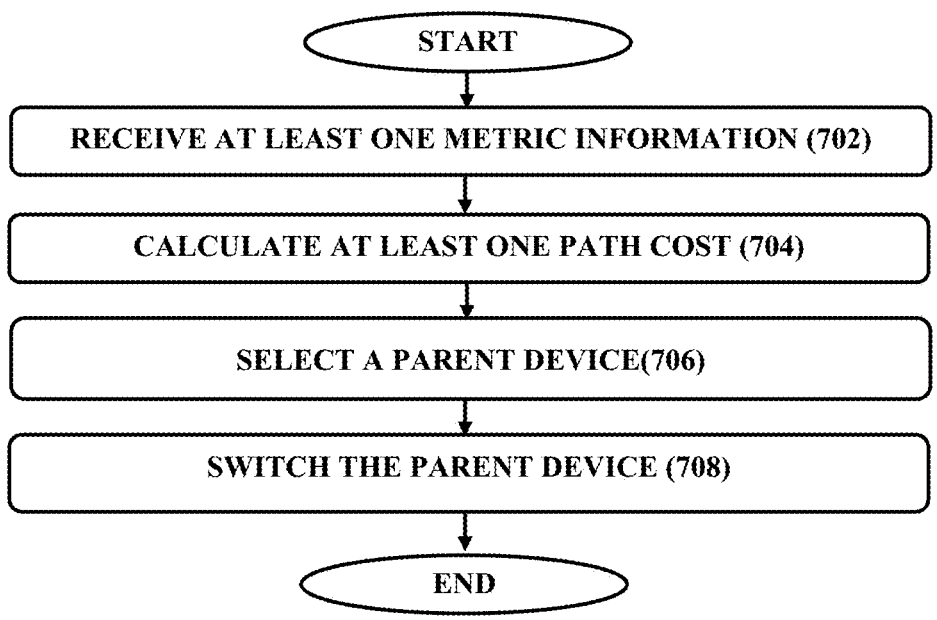
FIG. 7 illustrates a method for routing packets by the device/the node (602) in Routing Protocol for LLN (RPL) based balanced Ad-hoc network formation, in accordance with an embodiment of the present subject matter.
FIG. 8 illustrates a message format of the DAG metric container, in accordance with an embodiment of the present subject matter.
FIG. 9 illustrates a format for the metric data, in accordance with an embodiment of the present subject matter.

In one implementation, as compared to the existing technique, to disseminate the metrics in the RPL based network the present invention provides a new objective function BNOF (Balanced network objective function) that will use Routing table size (RTsize) as the metric object in case storing mode of operation, and Packet Processed Rate (PPR) as the metric object in case of non-storing mode of operation. Both of the RTsize and PPR object information may be sent in the DAG metric container option of the DIO message. The message format of the DAG metric container may be as shown in FIG. 8. The metric data part of the DAG metric container may contain the actual metric information.

In one implementation, the format for the metric data is as shown in FIG. 9. In one implementation, the fields may have the description as per the RFC 6551. In one implementation, For RTsize object the routing metric type value to 9 and for PPR routing metric value type 10 may be defined. Both the values need to be applied at IANA which is the central authority to obtain such values.

The current or existing ETX metric object is shown in FIG. 10. In one implementation, the ETX metric is the number of transmission a node expects to make to a destination in order to successfully deliver a packet. The ETX object is made of ETX sub-objects and MUST at least comprise of ETX sub-object. Each ETX sub-object has a fixed length of 16 bits.

As compared to the current or existing ETX metric object, the RTsize metric object according to the present invention is as shown in FIG. 11. In one implementation, the RTSize is of 16 bits. The value of RTSize at any node may indicate the aggregated value of the current routing table size of all the nodes to the ROOT via, the preferred parent. In one implementation, the DODAG Root (BR) must always set this value to zero. In one implementation, the DODAG Root may also possibly use any other static value in place of zero. Any non-leaf nodes directly connected to the BR must set this value to their current routing table size. All other nodes in the network must send the same value in their DIO metric container as their preferred parent.

In one implementation, as shown in FIG. 12, the RTsize metric object is modeled similar to ETX object.

Figure 13:
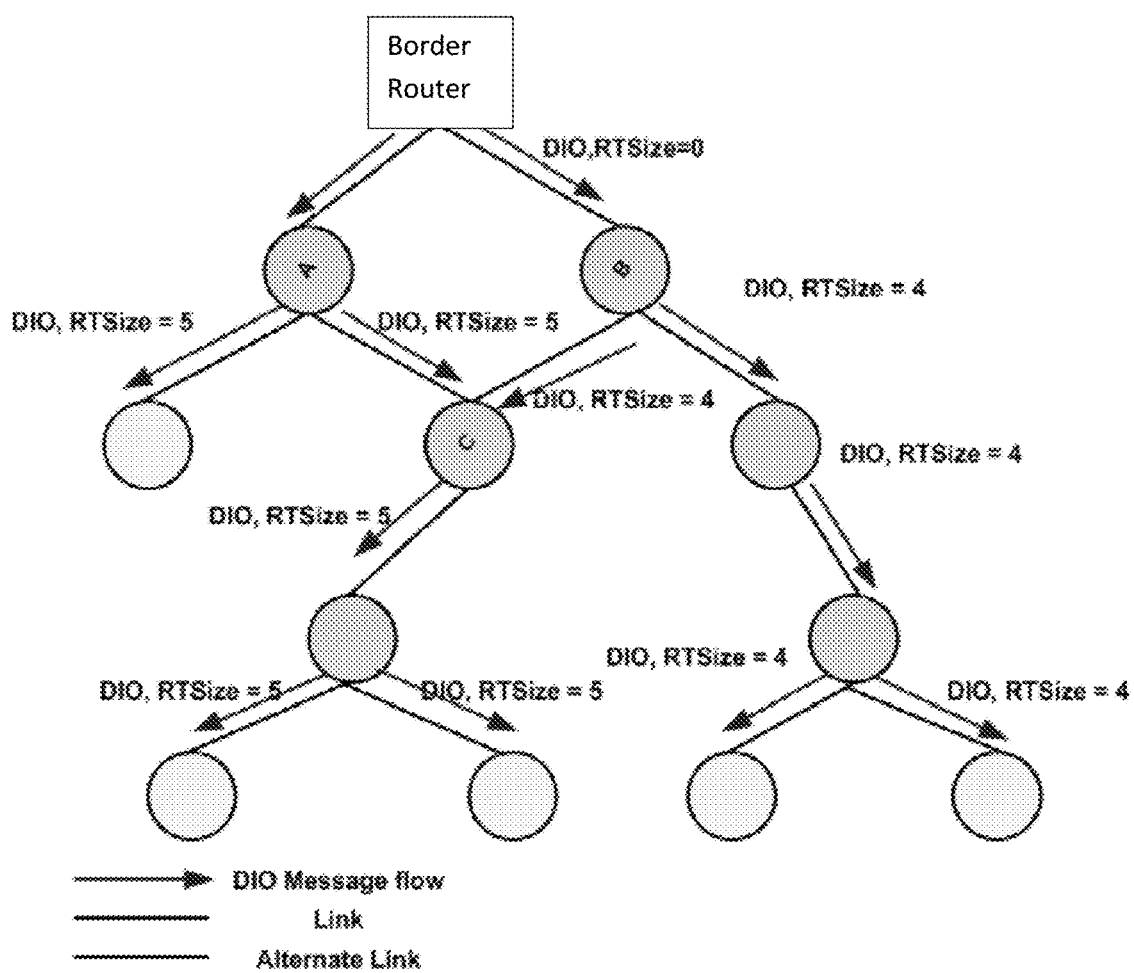
FIG. 13 illustrates an RTsize metric information flow (DIO message flow), in accordance with an embodiment of the present subject matter.

In one implementation, the rank calculation of any node may be similar to the existing techniques and the metrics according to the present invention may not have any effect on the rank calculation. For example, as shown in FIG. 13 illustrates RTsize metric information flow (DIO message flow). For rank calculation, in view of FIG. 13, the border router sends a DIO with rank=256, minHopRankIncrease=256. The DIO message is received and accepted by Node A and Node B. On accepting it, Nodes A and Node B calculate their own rank i.e. the rank received in DIO message (256)+minHopRankIncrease (256)=512. Thus both Node A and Node B set their own rank to 512 and then broadcasts the DIO message (with new rank=512) to the nodes below.

In one implementation, as compared to the existing technique, to calculate the path cost, the present invention enables the root nodes (grounded or floating) set the variable cur_min_path_cost to zero. The non-root nodes may use the metric value received in the DIO from its neighbouring nodes to calculate the path cost through that particular neighbour. A non-root node may add two components to calculate the neighbours path cost from the RTsize/PPR object value received in the DIO, or its own routing table size plus, if the neighbour is not its current preferred parent. (For preferred parent node no need to add its own routing table size as its parent already has the routing entries for the node and the sub-DODAG for which it's the root), or a parent switch threshold (PARENT_SWITCH_THRESH-OLD), if the neighbour is not the preferred parent. The default value used for PARENT_SWITCH_THRESHOLD is 1.

In one implementation, the path cost is calculated using the below mentioned equation:

$$PathWt = \begin{cases} NB_{RTSize} \xrightarrow{iff} DIO_{ip} == PrefParent_{ip} \\ NB_{RTSize} + OWN_{RTsize} + 1 \xrightarrow{iff} \text{otherwise} \end{cases}$$

Stateless Routing Metric Calculation $$PathWt = \begin{cases} NB_{PPR} \xrightarrow{iff} DIO_{ip} == PrefParent_{ip} \\ NB_{PPR} + OWN_{PPR} + 1 \xrightarrow{iff} \text{otherwise} \end{cases}$$

Stateful Routing Metric Calculation

Wherein, the value 1 in the above equation is the default parent switch threshold.

In one implementation, as compared to the existing technique, to select the best parent, the present invention provides the objective function (BNOF) which enables to choose the neighbour with minimum path cost as the preferred parent.

In one implementation, the objective function enables the parent selection each time when any node is added or deleted or even after a pre-set interval of time set for the balanced network formation. In one example, the path cost for an existing candidate neighbour, including the preferred parent, changes. This condition may be checked immediately after the path cost is computed. In other example, a new candidate neighbour may inserted into the neighbour table, which will require to balance the network accordingly.

In one implementation, the existing technique for the parent switching procedure as per the RPL RFC (6550) is known. According to the know technique, during initial phase of the network formation the values of the metrics objects may be zero so in this case nodes will select the neighbour from whom it receives the DIO first, as its preferred parent and joins the network. As more and more nodes join the network and the metrics values will also change and nodes will change the preferred parent as per the path cost calculated from the metric values received in the DIO message. Node may change the preferred parent if an only if the computed path cost through another candidate parent is less than the current preferred parent. In case of path costs are equal node will not change its preferred parent. If a node changes its preferred parent it has to send a NO-PATH DAO to its preferred parent and resets its DIO timer to send the DIO to its sub-DODAG with the new updated metric. When a node receives a NO-PATH DAO for a route it will remove the routing table entry for that particular node. But other routes entries through the node that sends the no-path DAO will still be there on the last preferred parent of the node. These invalid entries will affect the metric value for RTSize metric object (as its dependent on the routing table size) of the last preferred parent.

However, to solve this problem of invalid entries, the present invention, upon receiving the no-path DAO a parent node enables to remove the routing entries from the routing table for which the sender of the no-path DAO is the next-hop for downward traffic.

FIG. 7 illustrates a method for obtaining a balanced Ad-hoc network formation, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, software, firmware, or combination thereof. However, for ease of explanation, in the embodiments described below, the method may be considered to be implemented in the above described device/node 602.

At block 702, at least one metric information is received from at least one border router or at least one other device.

At block 704, at least one path cost of at least one neighbouring node/device, selected from one or more nodes in an Ad-hoc network, is calculated according to the metric information received.

At block 706, if the path cost of neighbouring node/device is minimum, the neighbouring node/device is selected as a parent node/other device.

At block 708, a current parent node/device is switched with the parent node based on selection and based on an amount of workload of the parent node/device and the current parent node/device, respectively, wherein the current parent node/device of the node/device is switched to the parent node/device if the path cost of parent node/device is minimum as compared to a path cost of the current parent node/device, and the amount of workload of the parent node/device is less as compared to an amount of workload of the current parent node/device.

In one implementation, the method further comprises receiving the metric information with at least one Destination Oriented Directed Acyclic Graph Information Object (DIO) control message, wherein the DIO control message comprises at least one container holding the metric information.

In one implementation, the metric information is at least one of a Routing table size (RTsize) as a metric object for storing mode of operation, or a Packet Processed Rate (PPR) as a metric object for non-storing mode of operation or any combination thereof.

In one implementation, the method enables routing at least one packet in a low-power and lossy network to achieve a load balanced routing.

In one implementation, the method comprises storing at least one packet in a memory of the device; and determining, by a processor of the device, the workload based on a number of packets stored in the memory.

In one implementation, the method comprises holding, using balanced network objective function (BNOF) the metric information, wherein the metric information is at least one of a Routing table size (RTsize) as a metric object for storing mode of operation, or a Packet Processed Rate (PPR) as a metric object for non-storing mode of operation or any combination thereof.

In one implementation, the method comprises calculating the path cost based on at least one metric value received with at least one Destination Oriented Directed Acyclic Graph Information Object (DIO) control message, the DIO control message comprises at least one container holding the metric information along with the metric value.

In one implementation, the method comprises calculating the path cost based on at least the metric information received, and/or a routing table size of the device, and/or a parent switch threshold.

In one implementation, the method comprises calculating the path cost using:

$$PathWt = \begin{cases} NB_{RTSize} \xrightarrow{iff} DIO_{ip} == PrefParent_{ip} \\ NB_{RTSize} + OWN_{RTSize} + 1 \xrightarrow{iff} \text{otherwise} \end{cases}$$

Stateless Routing Metric Calculation $$PathWt = \begin{cases} NB_{PPR} \xrightarrow{iff} DIO_{ip} == PrefParent_{ip} \\ NB_{PPR} + OWN_{PPR} + 1 \xrightarrow{iff} \text{otherwise} \end{cases}$$

Stateful Routing Metric Calculation

In one implementation, the method comprises storing information of the neighbouring devices, in at least one table residing in the memory of the device, wherein the table is updated consecutively on calculation of the path cost.

In one implementation, the method upon switching the parent device, comprises transmitting, by the device 602, at least one NO-PATH Destination Oriented Directed Acyclic Graph Advertisement Object (DAO) message to the parent device switched, on receipt of the DAO message, the parent device is configured to delete at least one routing entry from at least one routing table of the parent device for which the device is the next-hop for a downward communication.

In one implementation, according to the present invention, the stateless metric assumes all the nodes generate (approximately) equal amount of traffic over a period of time and thus all the nodes are treated equally by the routing protocol. In such a case, Routing Table Size (RTsize) is used as the routing metric. The advantage of the stateless metric is that it requires no additional memory for metric processing, and it is simple to implement, and hence involves less program complexity.

Referring now to FIG. 14 shows, the network formation as per the existing available techniques. In one example, for the formation of network as per FIG. 14, RTsize as the metric is considered and thus the PathWt value may be equal to RTsize metric. Step by step explanation of procedure is as follows:

a. The border router initiates DIO transmission to form the network. Initially none of the nodes have routing entries since the network is to be formed for the first time. In this case, there are two options available (as per the existing standards), i) if any other metric is available then that could be used to form the network ii) the network could be formed by accepting the DIO of first come first serve basis.

b. DIO message is a link local broadcast message i.e. the message will reach the nodes connected on the same link. For example, in the above figure, a DIO message sent by border router will reach Node A and B only.

c. Border router sends a DIO message with PathWt=RTsize=0 which is received by Node A and B. Node A and B will receive the DIO message and accept it. Here acceptance of the message means that all the clauses in DIO message are acceptable to Node A and Node B and secondly they prefer using this DIO message against any other DIO message from any other source. Another point of acceptance of DIO message means that the node will further broadcast the DIO message after updating the metric information. For example, Node A got PathWt=Rtsize=0 metric, Node A as of now has RTsize=0, and thus updates the outgoing RTsize=0+0=0 and then send it.

d. Node D will receive RTsize of 0 from Node A. Node D will accept it since it's the only DIO received and the metric is supported.

e. Node D sends back a DAO message to Node A. On receiving DAO message, Node A populates its routing table entry with Node D. Thus the RTsize value on Node A becomes 1.

f. Based on initial network formation (as explained in step a-e, i.e. fcfs basis), the Node A will have RTsize=1 (i.e. only one child node), and Node B will have an RTsize=8 (i.e. 8 child/grandchild nodes). Thus the routing table size state will look like in FIG. 14. All the child send their application packets through their preferred parent i.e. in this case Node B will receive application packets from 8 child nodes and Node A will receive application packets only from 1 node.

g. Thus the initial network is formed. It is obvious that the network is skewed since Node B is handling lot of child nodes as compared to Node A.

h. According to the present invention, a DIO message transmission is periodic in nature. Border router after some time will send another DIO message with RTsize=0. Please note that border router always sends a fixed RTsize (it is zero in our case but it could as well be any other static number and it doesn't matter).

i. DIO message is received by Node A and Node B. Node A and Node B accepts the DIO message and further broadcast it down the network. Before forwarding the metric is updated. Node A sends RTsize=0+1=1, and Node B sends RTsize=0+8=8.

j. Node C which was previously connected to Node B, now receives DIO message from Node A (with PathWt=1) and from Node B (with PathWt=8).

k. Node C calculates NewPathWt_A=PathWt_A+Node-C_RTsize=1+3=4, and NewPathWt_B=8. (the formula is given below for NewPathWt calculation.

l. Node C switches to Node A i.e. selects Node A as preferred parent because NewPathWt_A<NewPathWt_B . . . . Thus the RTsize on A is increased to 5 (NodeA_RTsize+NodeC_RTsize+1=1+3+1=5). At the same time RTsize on B is decreased to 4 (NodeB_Rtsize−NodeC_Rtsize−1=8−3−1=4)

m. Thus the new network which is obtained according to the present invention is as shown in FIG. 15.

In one implementation, FIG. 14 shows initial network formation. When the network starts up the RTsize is not previously known and thus the network formation happens using other criteria such as ETX.

In one implementation, FIG. 15 shows how the network links changes once the RTsize is known on every node. When a node receives multiple DIOs, it compares the DIOs using following formula:

$$PathWt = \begin{cases} NB_{RTSize} \xrightarrow{iff} DIO_{ip} == PrefParent_{ip} \\ NB_{RTsize} + OWN_{RTsize} + 1 \xrightarrow{iff} \text{otherwise} \end{cases}$$

Stateless Routing Metric Calculation $$PathWt = \begin{cases} NB_{PPR} \xrightarrow{iff} DIO_{ip} == PrefParent_{ip} \\ NB_{PPR} + OWN_{PPR} + 1 \xrightarrow{iff} \text{otherwise} \end{cases}$$

Stateful Routing Metric Calculation

In one implementation, if the DIO is received from a node which is currently its preferred parent already then only the Path weight (i.e. RTsize in DIO) is used. If the DIO is received from a node which is not currently its preferred parent then the node uses the Path Weight (RTsize in DIO)+the current Routing table size+1. These two numbers are compared and if the value of the new parent is less than the currently preferred parent then the node switches the path. For example considering FIG. 14 for implementing network balancing according to the present invention:

Node C receives DIO_A(PathWt=1), NewPathWt=PathWt+Rtsize+1=1+3+1=5

Node C receives DIO_B(PathWt=8), NewPathWt=PathWt=8 thus Node C chooses Parent A as preferred parent since the NewPathWt(5) is the least, thereafter FIG. 15 shows the new network formation.

In one implementation, the stateful metric is needed in case where the traffic generated from different nodes is "highly" uneven. Using RTsize metric might prove inefficient since RTsize balances based on the number of connected nodes and does not consider traffic pattern. Under stateful metric, each Node maintains packets processed rate (PPR) as the metric. The overall logic remains same a stateless operation just that the metric considered for calculating Path Weight is PPR.

The stateful metric has some advantages that may include but not limited to it considers actual traffic pattern, and it works in scenarios where nodes generate uneven traffic.

Figure 16:
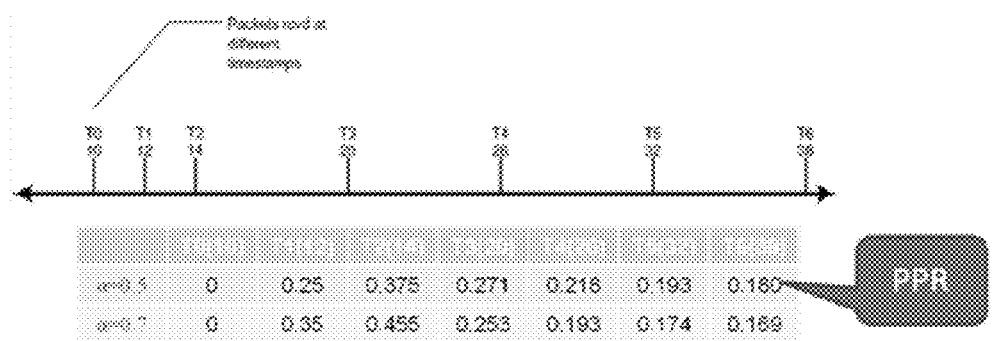
FIG. 16 illustrates a PPR calculation, in accordance with an embodiment of the present subject matter.

Referring now to FIG. 16 shows an example of how packets processed rate is calculated. In one implementation, Packet Processed Rate can be calculated by considering recursive averaging technique: y[n]=(1−α)y[n−1]+αx[n]. For PPR, the calculation will be: Current_PPR=α*(1/(tn−tn−1))+(1−α)*Previous_PPR In one implementation, higher a value will result in latest values getting higher priority, and any unit such as ticks, timestamps, and clock time may be used.

Figure 17:
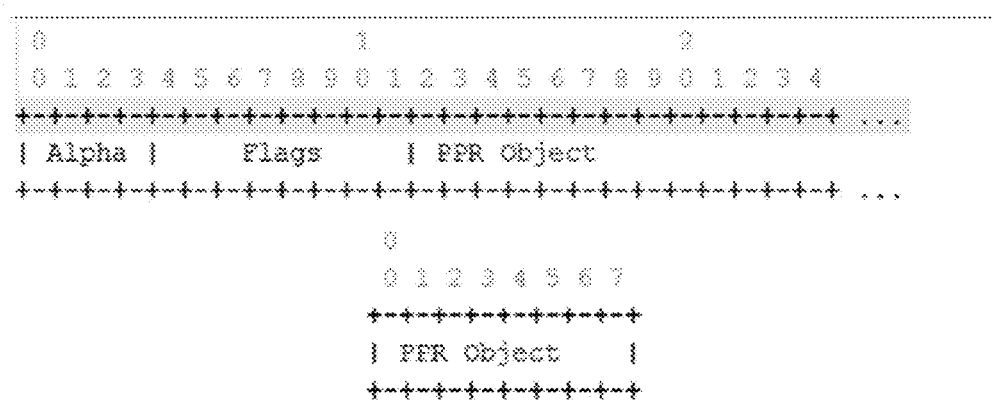
FIG. 17 illustrates a PPR metric object format, in accordance with an embodiment of the present subject matter.

In one implementation, FIG. 17 illustrates a format PPR metric according to an embodiment of the present invention. In one implementation, the PPR metric object may passed as part of DIO metric container. The format of PPR metric may be as shown in FIG. 17.

In one implementation, the Alpha as shown in FIG. 17 is used for running average calculation as shown in FIG. 16. Alpha is calculated as 1/Alpha. For e.g., to set an alpha value of 0.5, the Alpha sent in the metric is 2 (i.e. ½=0.5).

In one example, in order to understand how PPR is updated whenever any packet is received, please refer to FIG. 16. Considering Assuming alpha=0.5, At T0 ($10^{th}$ sec), a packet is received. Since this is the first packet to be received Current_PPR=0.

At T1 ($12^{th}$ sec), another packet is received, the calculation is as follows:

Current_PPR=0.5*(1/(12−10))+(1−0.5)*Previous_PPR .... Previous_PPR here is 0, thus Current_PPR=0.5*0.5+0=0.25

At T2($14^{th}$ sec), the calculation is

Current_PPR=0.5*(1/14−12)+(1−0.5)*0.25=0.25+0.125=0.375

The table below shows a comparison of newly defined BNOF objective function of the present invention vis-à-vis existing objective functions:

TABLE 1

Comparison of BNOF versus standard objective functions

| Objective Function | Function | Advantage | Application scenario |
|---|---|---|---|
| Objective Function 0 (Zero) IETF RFC 6552 | Choose a path which has minimum number of hops | Shortest path first will be chosen | Home Automation, Street lights |
| Objective Function 1. IETF RFC 6719 | Choose a path which has minimum number of retransmissions when sending packet | Reduces packet retransmissions | Home Automation |
| BNOF (stateless) | Choose a path which balances routing entries in the nodes | Balances network load when all the nodes generates approximately similar amount of traffic | Agriculture, Smart Meter |
| BNOF (stateful) | Choose a path which balances network traffic amongst the nodes | Balances network load when the nodes generate uneven amount of traffic | Building automation, Smart City, Smart Meter |

In one implementation, in order to accomplish the present invention, some changes may be required to be performed on border router. Some of the changes are mentioned below:

a. Border router initiates DIO transmission and also is in charge of deciding which routing metrics to be used. Thus if a BR decides to use RTsize or PPR as metric then the initial DIO message needs to be constructed as per the metric object creation specified for RTsize and PPR.

b. In case of stateful metric, the border router decides the alpha to be used for the running average calculation for calculating the PPR. All the other nodes in the network need to mandatorily follow the same unit of alpha which is advertised by the BR.

In one implementation, in order to accomplish the present invention, some changes may be required to be performed on hops and end nodes. Some of the changes are mentioned below:

a. End node on receiving a DIO message inspects whether the metric object is either RTsize or PPR.

b. For PPR it needs to additionally initiate calculation of PPR as per FIG. 16 c. If the alpha value has changed from previous PPR metric object, then the PPR calculations needs to be reset and henceforth proceeded with the new alpha value.

In one implementation, the present invention may be implemented at a border router configured to initiate the network formation. Border router can initiate a network formation using the routing metrics defined according to the present invention.

In one implementation, the present invention may be implemented at a Smart Gateways/controller used in home networks, industrial networks and control the way network is formed.

In one implementation, the present invention may be implemented at End devices such as sensors, actuators, HVACs etc., will need to understand and implement the routing metrics defined in this metrics.

In one implementation, following are the common traits which are utilized by the present invention:

Scenario where battery-based nodes are deployed

Scenario where the number of nodes are relatively more in number

The data transmission is periodic in nature and usually very low for e.g. once in 5 minutes. An example is smart energy meter infrastructure where the energy meter sends the reading once in 5 minutes or once in 30 minutes.

Most of the traffic is MP2P in nature i.e. telemetric application such as data collection from sensor networks.

In one implementation, the present invention may be used in smart agriculture scenario, wherein Multiple sensors interconnecting each other to form a mesh network. Our balancing idea can be deployed in this scenario to improve overall network lifetime.

In one implementation, the present invention may be used in smart meter scenario, wherein thousands of smart meters interconnect via each other to form a mesh network. They transmit the data periodically at less frequency.

In one implementation, the present invention may be used in smart city solutions that encompass many different use-cases. An example use-case is the smart bins use-case where smart recycle-bins are provisioned in the city and it contains a sensor and communication system which enables the controller to identify which bins are full and which aren't. Typically battery based system would be used in such a case and the transmission frequency will be low.

Apart from what is explained above, the present invention also include the below mentioned advantages:

Balancing of network achieves evenly energy spending in the network improving network lifetime.

The packet delivery rate will improve since the load will be balanced in the network.

The logic to decide the network formation is very lightweight and can be easily used on constrained devices without any additional resources. For e.g. our logic does not add to existing RAM/ROM constraints.

Highly Available: Since the database is distributed, if one database server goes down, only those process data present in that database will not be available, and the system can continue to run fine for other processes. With the prior solution, if the single centralized database goes down, the entire system will not be available.

Apart from what is explained above, the present invention provides:

Border router and all the nodes in the network that support routing metrics RTsize (Routing table size) and PPR (packets processed rate).

The path weight which could either be RTsize or PPR is used by all the nodes to decide which parent to use.

For PPR, every node maintains a statistics counter to identify the packets processed rate.

Proactive technique of network balancing wherein the network is formed in balanced form. Compared to reactive technique wherein the network is realigned when the energy consumption reaches a certain threshold for the node.

Technique to balance the network based on number of routing table entries (Stateless metric, RTsize)

Technique to balance the network based on the traffic pattern (Using stateful metric, PPR)

Mechanism to extend the routing protocol metrics/constraints to consider network balancing.

A mechanism for nodes to identify which parent to select to achieve balanced network.

It may be understood by the person skilled in the art that:
1. The techniques as disclosed in the present invention are mentioned in context to Low power and lossy networks but it can also be used in context to Mobile Ad-hoc networks (MANET) or any other ad-hoc/mesh based topology formation scenario.
2. The PPR (Packets processed rate) as a mechanism as disclosed in the present invention to identify the amount of network load on the node. There can be other mechanisms such as transport layer statistics, network layer statistics, or SNMP/Netconf like mechanism to identify the load on the node, may be used.
3. Usage of RPL as disclosed in the present invention is an example to discuss about balanced network formation. But essentially any proactive routing protocol which supports routing metrics/constraints can be used. For e.g. AODVv2 routing protocol supports routing metrics and constraints and can be used for deploying the explained idea.
4. The defined metrics as disclosed in the present invention may be used in conjunction with other metrics such as (ETX, Latency, Node Energy, Node States and attributes) to improve the network balancing.
5. Stateful metric as disclosed in the present invention defines how packets processed rate is calculated using the recursive average technique. Any other technique to identify packets processing rate may be used.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiment of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Although implementations for device and method for balanced ad-hoc network formation have been described in language specific to structural features and/or methods, it is to be understood that the appended claims are not necessarily limited to the specific features or methods described. Rather, the specific features and methods are disclosed as examples of implementations of the device and method for balanced ad-hoc network formation.

We claim:

1. A method for obtaining a balanced Ad-hoc network formation, the method comprising:
   receiving, by a device, at least one metric information from at least one other device;
   determining whether to use a Routing table size (RTsize) or a Packet Processed Rate (PPR) as a metric object for calculating a path cost of a neighbouring device based on a mode of operation, the mode of operation comprising a storing mode of operation or a non-storing mode of operation, wherein the RTsize is used as the metric object for calculating the path cost of the neighbouring device for the storing mode of operation, and wherein the PPR is used as the metric object for calculating the path cost of the neighbouring device for the non-storing mode of operation;

calculating at least one path cost of at least one neighbouring device, selected from one or more devices in an Ad-hoc network, according to the metric information received and the mode of operation;

in response to determining that the at least one path cost of the at least one neighbouring device is minimum, selecting the at least one neighbouring device as a parent device; and switching the parent device based on selection and based on an amount of workload, wherein a current parent device of the device is switched to the parent device if the at least one path cost of the parent device is minimum as compared to a path cost of the current parent device, and an amount of workload of the parent device is less than an amount of workload of the current parent device.

2. The method as claimed in claim 1, comprises receiving the metric information with at least one Destination Oriented Directed Acyclic Graph Information Object (DIO) control message, wherein the DIO control message comprises at least one container holding the metric information.

3. The method as claimed in claim 1 comprises:
storing at least one packet in a memory of the device; and
determining, by a processor of the device, the workload based on a number of packets stored in the memory.

4. The method as claimed in claim 1 characterized in that the device/node comprises a balanced network objective function (BNOF) holding the metric information.

5. The method as claimed in claim 1 comprises: calculating the path cost based on at least one metric value received with at least one Destination Oriented Directed Acyclic Graph Information Object (DIO) control message, the DIO control message comprises at least one container holding the metric information along with the metric value.

6. A apparatus for obtaining a balanced Ad-hoc network formation, comprising: a processor, a transceiver, and a memory coupled to the processor and configured to store a plurality of instructions that, when executed, causes the processor to perform a method with the transceiver, the method comprising:

receiving at least one metric information from at least one other device;

determining whether to use a Routing table size (RTsize) or a Packet Processed Rate (PPR) as a metric object for calculating a path cost of a neighbouring device based on a mode of operation, the mode of operation comprising a storing mode of operation or a non-storing mode of operation, wherein the RTsize is used as the metric object for calculating the path cost of the neighbouring device for the storing mode of operation, and wherein the PPR is used as the metric object for calculating the path cost of the neighbouring device for the non-storing mode of operation;

calculating at least one path cost of at least one neighbouring device, selected from one or more devices in an Ad-hoc network, according to the metric information received and the mode of operation;

in response to determining that the at least one path cost of the at least one neighbouring device is minimum, selecting the at least one neighbouring device as a parent device; and switching the parent device based on selection and based on an amount of workload, wherein a current parent device of the apparatus is switched to the parent device if the at least one path cost of the parent device is minimum as compared to a path cost of the current parent device, and an amount of workload of the parent device is less than an amount of workload of the current parent device.

7. The method as claimed in claim 6, comprises receiving the metric information with at least one Destination Oriented Directed Acyclic Graph Information Object (DIO) control message, wherein the DIO control message comprises at least one container holding the metric information.

8. The method as claimed in claim 6 comprises:
storing at least one packet in a memory of the device; and
determining, by a processor of the device, the workload based on a number of packets stored in the memory.

9. The method as claimed in claim 6 characterized in that the device/node comprises a balanced network objective function (BNOF) holding the metric information.

10. The method as claimed in claim 6 comprises: calculating the path cost based on at least one metric value received with at least one Destination Oriented Directed Acyclic Graph Information Object (DIO) control message, the DIO control message comprises at least one container holding the metric information along with the metric value.

11. The method as claimed in claim 6 comprises: calculating the path cost based on at least one of the metric information received, a routing table size of the device, or a parent switch threshold.

12. A non-transitory computer-readable media storing computer instructions for obtaining a balanced Ad-hoc network formation, that when executed by one or more processors, cause the one or more processors to perform a method, the method comprising:

receiving, by a device, at least one metric information from at least one other device;

determining whether to use a Routing table size (RTsize) or a Packet Processed Rate (PPR) as a metric object for calculating a path cost of a neighbouring device based on a mode of operation, the mode of operation comprising a storing mode of operation or a non-storing mode of operation, wherein the RTsize is used as the metric object for calculating the path cost of the neighbouring device for the storing mode of operation, and wherein the PPR is used as the metric object for calculating the path cost of the neighbouring device for the non-storing mode of operation;

calculating at least one path cost of at least one neighbouring device, selected from one or more devices in an Ad-hoc network, according to the metric information received and the mode of operation;

in response to determining that the at least one path cost of the at least one neighbouring device is minimum, selecting the at least one neighbouring device as a parent device; and switching the parent device based on selection and based on an amount of workload, wherein a current parent device of the device is switched to the parent device if the at least one path cost of the parent device is minimum as compared to a path cost of the current parent device, and an amount of workload of the parent device is less than an amount of workload of the current parent device.

13. The method as claimed in claim 12, comprises receiving the metric information with at least one Destination Oriented Directed Acyclic Graph Information Object (DIO) control message, wherein the DIO control message comprises at least one container holding the metric information.

14. The method as claimed in claim 12 comprises:
storing at least one packet in a memory of the device; and determining, by a processor of the device, the workload based on a number of packets stored in the memory.

15. The method as claimed in claim 12 characterized in that the device/node comprises a balanced network objective function (BNOF) holding the metric information.

16. The method as claimed in claim 12 comprises: calculating the path cost based on at least one metric value received with at least one Destination Oriented Directed Acyclic Graph Information Object (DIO) control message, the DIO control message comprises at least one container holding the metric information along with the metric value.

17. The method as claimed in claim 12 comprises: calculating the path cost based on at least one of the metric information received, a routing table size of the device, or a parent switch threshold.

* * * * *